(12) United States Patent
Gomez et al.

(10) Patent No.: US 8,943,855 B2
(45) Date of Patent: Feb. 3, 2015

(54) METHODS FOR LASER CUTTING ARTICLES FROM ION EXCHANGED GLASS SUBSTRATES

(75) Inventors: Sinue Gomez, Corning, NY (US); Lisa Anne Moore, Corning, NY (US); Sergio Tsuda, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 366 days.

(21) Appl. No.: 13/387,790

(22) PCT Filed: Aug. 27, 2010

(86) PCT No.: PCT/US2010/046894
§ 371 (c)(1),
(2), (4) Date: Jan. 30, 2012

(87) PCT Pub. No.: WO2011/025908
PCT Pub. Date: Mar. 3, 2011

(65) Prior Publication Data
US 2012/0145331 A1 Jun. 14, 2012
US 2013/0180665 A2 Jul. 18, 2013

Related U.S. Application Data

(60) Provisional application No. 61/237,726, filed on Aug. 28, 2009.

(51) Int. Cl.
*C03B 33/02* (2006.01)
(Continued)

(52) U.S. Cl.
CPC ............. *C03B 33/0222* (2013.01); *C03B 33/04* (2013.01); *C03B 33/091* (2013.01)
USPC ...... 65/97; 65/105; 65/112; 65/115; 65/30.13

(58) Field of Classification Search
CPC C03B 33/091; C03B 33/0222; C03B 33/023; C03B 33/0235; C03B 33/027; C03B 33/10; C03B 33/082; C03B 33/102; C03B 33/04; C03B 33/07; C03B 33/074; C03B 33/076; C03B 33/093; C03B 33/02; C03B 33/033; H01L 21/78; B23K 26/367; B23K 26/38; B23K 26/00; B23K 26/0057
See application file for complete search history.

(56) References Cited

U.S. PATENT DOCUMENTS 3,687,799 A * 8/1972 Spanoudis .................... 428/336
4,468,534 A    8/1984 Boddicker
(Continued)

FOREIGN PATENT DOCUMENTS

DE  102007009786 A1   8/2008
JP  H09138942 A       5/1997
(Continued)

OTHER PUBLICATIONS

Chinese Notice of First Office Action & Search Report (with English Translation) dated May 29, 2013 for CN Patent Appln. No. 201080013575.7 filed Feb. 15, 2010; (14 Pages).
(Continued)

*Primary Examiner* — Jodi C Franklin
(74) *Attorney, Agent, or Firm* — John T. Haran

(57) ABSTRACT

A method of cutting an article (172) from a chemically strengthened glass substrate (110) includes generating a pulsed laser beam (108) from a laser source (106). The pulsed laser beam (108) may have a pulse duration of less than about 1000 fs and an output wavelength such that the chemically strengthened glass substrate (110) is substantially transparent to the pulsed laser beam (108). The pulsed laser beam (108) may be focused to form a beam waist (109) that is positioned in the same horizontal plane as an inner tensile region (124) of the chemically strengthened glass substrate (110). The beam waist (109) may be translated in a first pass along a cut line (116), wherein the beam waist (109) traverses an edge (111) of the chemically strengthened glass substrate. The beam waist (113) may then be translated in a second pass along the cut line (116) such that a crack (119) propagates from the edge (113) along the cut line (116) ahead of the translated beam waist (109) during the second pass.

20 Claims, 9 Drawing Sheets

(51) Int. Cl.
*C03B 33/04* (2006.01)
*C03B 33/09* (2006.01)

(56) References Cited

U.S. PATENT DOCUMENTS

| | | | |
|---|---|---|---|
| 4,702,042 A | 10/1987 | Herrington et al. | |
| 5,773,148 A * | 6/1998 | Charrue et al. | 428/410 |
| 6,211,488 B1 | 4/2001 | Hoekstra et al. | |
| 6,222,604 B1 | 4/2001 | Suginoya et al. | |
| 6,322,958 B1 | 11/2001 | Hayashi | |
| 6,676,878 B2 | 1/2004 | O'Brien et al. | |
| 6,949,485 B2 | 9/2005 | Nakashima et al. | |
| 6,992,026 B2 | 1/2006 | Fukuyo et al. | |
| 7,157,038 B2 | 1/2007 | Baird et al. | |
| 7,169,687 B2 | 1/2007 | Li et al. | |
| 7,169,688 B2 | 1/2007 | Liu | |
| 7,276,429 B2 | 10/2007 | Yamanaka | |
| 7,396,742 B2 | 7/2008 | Fukuyo et al. | |
| 7,498,238 B2 | 3/2009 | Tamura | |
| 7,514,294 B2 | 4/2009 | Higashino et al. | |
| 7,521,335 B2 | 4/2009 | Yamanaka | |
| 7,547,613 B2 | 6/2009 | Fukuyo et al. | |
| 7,550,367 B2 | 6/2009 | Tamura et al. | |
| 7,592,238 B2 | 9/2009 | Fukuyo et al. | |
| 7,615,721 B2 | 11/2009 | Fukuyo et al. | |
| 7,626,137 B2 | 12/2009 | Fukuyo et al. | |
| 7,732,730 B2 | 6/2010 | Fukuyo et al. | |
| 7,825,350 B2 | 11/2010 | Fukuyo et al. | |
| 7,871,903 B2 | 1/2011 | Couch et al. | |
| 8,232,218 B2 | 7/2012 | Dejneka et al. | |
| 8,283,595 B2 | 10/2012 | Fukuyo et al. | |
| 8,312,739 B2 | 11/2012 | Lee et al. | |
| 8,327,666 B2 * | 12/2012 | Harvey et al. | 65/112 |
| 8,341,976 B2 | 1/2013 | Dejneka et al. | |
| 8,389,891 B2 * | 3/2013 | Bovatsek et al. | 219/121.69 |
| 8,415,013 B2 | 4/2013 | Barefoot et al. | |
| 8,530,786 B2 * | 9/2013 | Bovatsek et al. | 219/121.69 |
| 8,561,429 B2 | 10/2013 | Allan et al. | |
| 8,623,776 B2 | 1/2014 | Dejneka et al. | |
| 2005/0221044 A1 | 10/2005 | Gaume et al. | |
| 2006/0021978 A1* | 2/2006 | Alexeev et al. | 219/121.72 |
| 2006/0040473 A1* | 2/2006 | Fukuyo et al. | 438/463 |
| 2006/0076105 A1* | 4/2006 | Furui et al. | 156/257 |
| 2006/0096426 A1* | 5/2006 | Park | 83/13 |
| 2006/0138798 A1 | 6/2006 | Oehrlein | |
| 2006/0160331 A1* | 7/2006 | Fukuyo et al. | 438/463 |
| 2006/0255195 A1 | 11/2006 | Chen et al. | |
| 2007/0090100 A1* | 4/2007 | Yonai et al. | 219/121.69 |
| 2007/0125757 A1 | 6/2007 | Fukuyo et al. | |
| 2007/0151962 A1 | 7/2007 | Doll et al. | |
| 2007/0170159 A1* | 7/2007 | Fukumitsu | 219/121.69 |
| 2007/0178714 A1* | 8/2007 | Gu et al. | 438/795 |
| 2007/0298529 A1* | 12/2007 | Maeda et al. | 438/33 |
| 2008/0000884 A1* | 1/2008 | Sugiura et al. | 219/121.67 |
| 2008/0061043 A1* | 3/2008 | Fujii | 219/121.69 |
| 2008/0135532 A1* | 6/2008 | Hasaka et al. | 219/121.78 |
| 2008/0286548 A1 | 11/2008 | Ellison et al. | |
| 2009/0142568 A1 | 6/2009 | Dejneka et al. | |
| 2009/0194517 A1* | 8/2009 | Yue | 219/121.75 |
| 2009/0250446 A1* | 10/2009 | Sakamoto | 219/121.72 |
| 2010/0012633 A1* | 1/2010 | Atsumi et al. | 219/121.72 |
| 2010/0035038 A1 | 2/2010 | Barefoot et al. | |
| 2010/0055876 A1 | 3/2010 | Fukuyo et al. | |
| 2010/0089882 A1* | 4/2010 | Tamura | 219/121.69 |
| 2010/0119846 A1 | 5/2010 | Sawada | |
| 2010/0176100 A1 | 7/2010 | Fukuyo et al. | |
| 2010/0206008 A1* | 8/2010 | Harvey et al. | 65/105 |
| 2010/0210442 A1* | 8/2010 | Abramov et al. | 501/66 |
| 2010/0291353 A1 | 11/2010 | Dejneka et al. | |
| 2011/0021004 A1 | 1/2011 | Fukuyo et al. | |
| 2011/0027971 A1 | 2/2011 | Fukuyo et al. | |
| 2011/0027972 A1 | 2/2011 | Fukuyo et al. | |
| 2011/0037149 A1 | 2/2011 | Fukuyo et al. | |
| 2011/0138857 A1* | 6/2011 | Numata et al. | 65/28 |
| 2011/0226832 A1 | 9/2011 | Bayne et al. | |
| 2012/0047956 A1* | 3/2012 | Li | 65/112 |
| 2012/0047957 A1* | 3/2012 | Dannoux et al. | 65/112 |
| 2012/0052302 A1 | 3/2012 | Matusick et al. | |
| 2012/0135195 A1* | 5/2012 | Glaesemann et al. | 428/156 |
| 2012/0145331 A1* | 6/2012 | Gomez et al. | 156/712 |
| 2013/0091897 A1* | 4/2013 | Fujii et al. | 65/112 |
| 2013/0095260 A1* | 4/2013 | Bovatsek et al. | 428/34.1 |
| 2013/0122264 A1* | 5/2013 | Fujii et al. | 428/192 |
| 2013/0180665 A2* | 7/2013 | Gomez et al. | 156/712 |
| 2013/0199241 A1* | 8/2013 | Sawada | 65/30.14 |
| 2013/0224439 A1* | 8/2013 | Zhang et al. | 428/157 |
| 2013/0280495 A1* | 10/2013 | Matsumoto | 428/172 |
| 2013/0291597 A1* | 11/2013 | Saito et al. | 65/112 |
| 2013/0291598 A1* | 11/2013 | Saito et al. | 65/112 |
| 2013/0323469 A1* | 12/2013 | Abramov et al. | 428/155 |
| 2014/0015113 A1 | 1/2014 | Kuno et al. | |
| 2014/0093693 A1* | 4/2014 | Zhang et al. | 428/157 |
| 2014/0102146 A1* | 4/2014 | Saito et al. | 65/112 |

FOREIGN PATENT DOCUMENTS

| | | |
|---|---|---|
| JP | 2002192369 A | 7/2002 |
| JP | 2003088976 A | 3/2003 |
| JP | 2004268104 A | 9/2004 |
| JP | 2004299969 A | 10/2004 |
| JP | 2005294325 A | 10/2005 |
| JP | 2007290304 A | 11/2007 |
| JP | 2009061462 A | 3/2009 |
| JP | 2009072829 A | 4/2009 |
| JP | 4490883 B2 | 6/2010 |
| KR | 100626553 B1 | 9/2006 |
| KR | 100921662 B1 | 10/2009 |

OTHER PUBLICATIONS

Chinese Notice of Second Office Action (with English Translation) dated Dec. 19, 2013 for CN Patent Appln. No. 201080013575.7 filed Feb. 15, 2010; (11 Pages).
English translation of Japanese Non-Final Office Action dated Feb. 12, 2013 for JP Patent Appln. No. 2011-551156 filed Feb. 15, 2010; pp. 1-4.
International Search Report & Written Opinion dated Apr. 20, 2010 relating to PCT/US2010/024229 filed Feb. 15, 2010; (14 Pages).
International Search Report & Written Opinion dated Jan. 19, 2011 relating to PCT/US2010/046894 filed Aug. 27, 2010; (13 Pages).
International Search Report & Written Opinion dated Mar. 6, 2013 relating to PCT/US2012/063771 filed Nov. 7, 2012; (12 Pages).
Taiwan Search Report mailed Apr. 2, 2013, for Taiwan Patent Application No. 099104918 filed Feb. 12, 2010; (1 Page).
Decision of Patent Examination—Notice of Allowance (with English Translation) for Taiwan Patent Application No. 099104918 filed Feb. 12, 2010; (4 Pages).
Non-Final Office Action mailed May 15, 2014 for U.S. Appl. No. 13/299,901, filed Nov. 18, 2011.

* cited by examiner

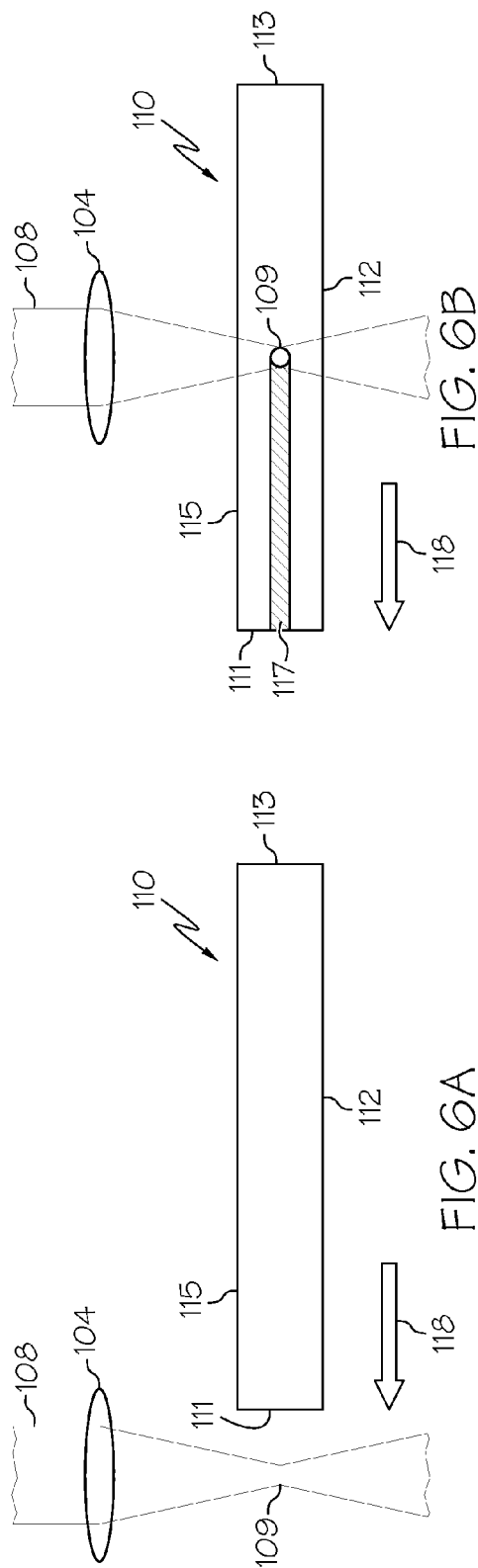
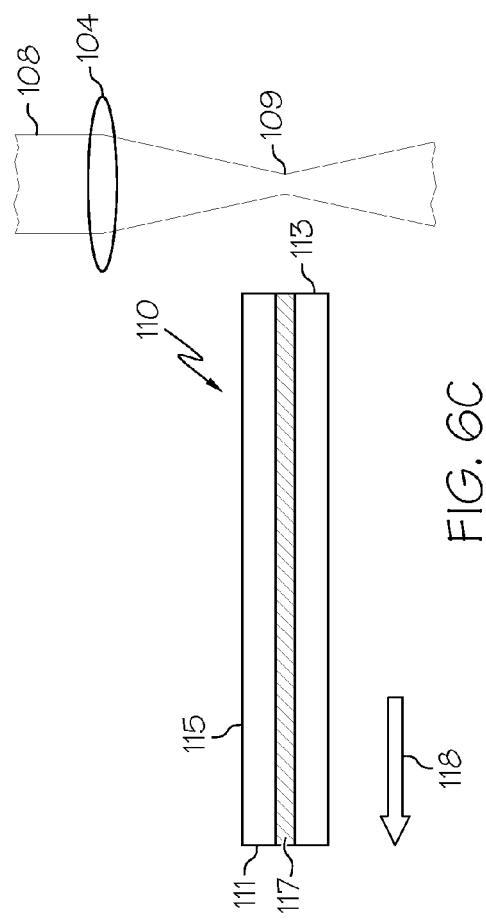

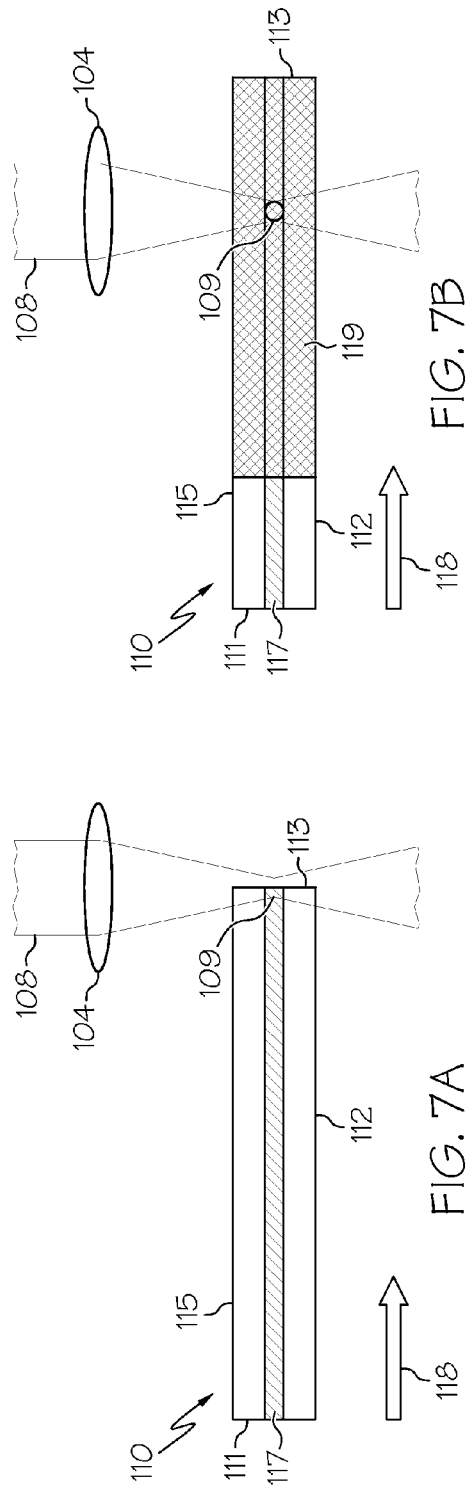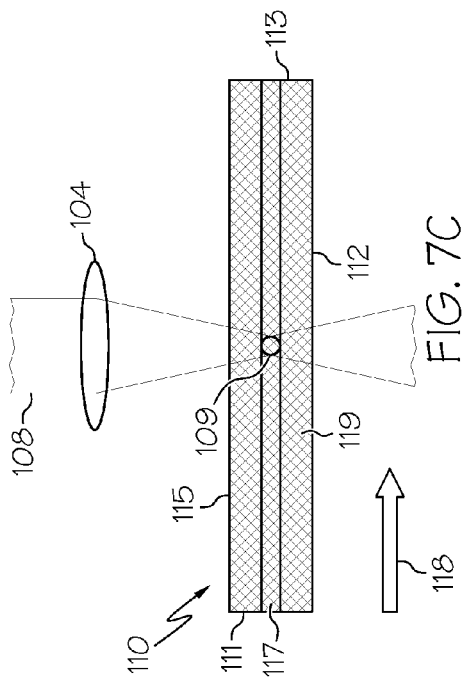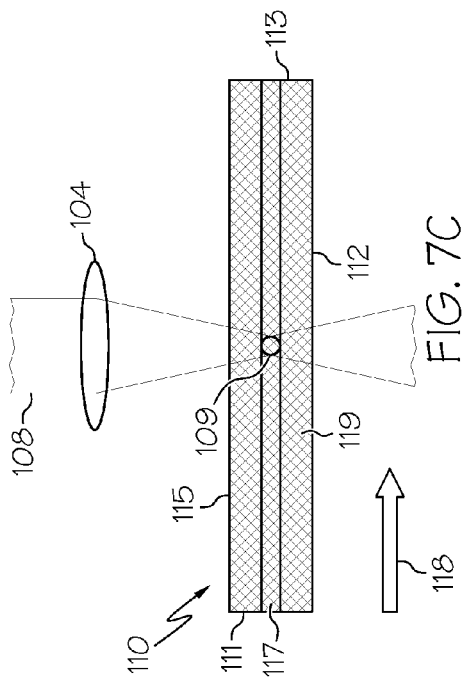

METHODS FOR LASER CUTTING ARTICLES FROM ION EXCHANGED GLASS SUBSTRATES

CROSS-REFERENCE TO RELATED APPLICATIONS

This application claims the benefit of priority under 35 U.S.C. §119(e) of U.S. Provisional Application Ser. No. 61/237,726 filed on Aug. 28, 2009.

BACKGROUND

1. Field

The present specification generally relates to methods for cutting an article from a glass substrate and, more specifically, to methods for laser cutting an article from a chemically strengthened glass substrate.

2. Technical Background

Thin chemically strengthened glass substrates have found wide-spread application in consumer electronics because of their excellent strength and damage resistance. For example, such glass substrates may be used as cover sheets for LCD and LED displays incorporated in mobile telephones, display devices such as televisions and computer monitors, and various other electronic devices. Such glass substrates used in consumer electronics devices may be formed by sectioning or separating a large glass substrate into a plurality of smaller glass substrates using various cutting techniques.

Chemically strengthened glass has surfaces which are under compression and an interior region which is under tension. Elastic energy, proportional to the square of the central tension, is stored in this central tensile region. As an example, surface compressions of greater than 750 MPa and compressive layer depths greater than 40 µm may be present in chemically strengthened glass.

High surface compression and deep surface compressive layers are beneficial for scratch and damage resistance, but make it difficult to mechanically scribe the glass as in traditional scribe-and-bend processes. Furthermore, if the stored elastic energy is sufficiently high, the glass will break in an explosive manner when the surface compression layer is penetrated. In other instances, the release of the elastic energy may cause the break to deviate from a desired cut line, thereby damaging the glass substrate.

Additionally, the process of cutting or separating glass via laser ablation is relatively slow because the glass removal rate is very low. Another issue with this technique is the poor edge finish quality, which is almost always left with weakening defects. This type of process tends to generate a great deal of debris. The laser ablation process also requires an additional mechanical breaking step following the laser scribing or defect creation.

Scribe-and-bend and laser ablation processes may perform quite well in separation of non chemically strengthened glass in straight lines, but are limited in operations that involve cutting more complex shapes. Furthermore, the challenge in cutting chemically strengthened glass can be much larger than for cutting other ordinary sheets of glass.

Accordingly, a need exists for alternative methods for cutting chemically strengthened glass substrates.

SUMMARY

In one embodiment, a method of cutting an article from a chemically strengthened glass substrate includes generating a pulsed laser beam from a laser source. The pulsed laser beam may have a pulse duration of less than about 1000 fs and an output wavelength such that the chemically strengthened glass substrate is substantially transparent to the pulsed laser beam. The pulsed laser beam may be focused to form a beam waist that is positioned in the same horizontal plane as an inner tensile region of the chemically strengthened glass substrate. The beam waist may be translated in a first pass along a cut line, wherein the beam waist traverses an edge of the chemically strengthened glass substrate. The beam waist may then be translated in a second pass along the cut line such that it traverses the edge of the chemically strengthened glass substrate and a crack propagates from the edge of the chemically strengthened glass substrate along the cut line ahead of the translated beam waist during the second pass.

In another embodiment, a method of separating an article from a substrate having an inner tensile region positioned between a first and second surface compression layer may include forming an internal compression region within the inner tensile region of the substrate along a cut line beginning at an edge of the substrate. The formation of the internal compression region generates a first and a second internal tension layer positioned above and below the internal compression region, respectively. The method may further include heating the generated internal compression region such that a tensile stress of the first and second internal tension layers is increased and a crack initiates from the edge of the substrate and propagates along the internal tensile region.

In yet another embodiment, a method of cutting an article from a chemically strengthened glass substrate includes generating a pulsed laser beam from a laser source having an output wavelength such that the chemically strengthened glass substrate is substantially transparent to the pulsed laser beam. The pulsed laser beam may be focused to form a beam waist that is located in the same horizontal plane as an inner tensile region of the chemically strengthened glass substrate. The beam waist may be translated in a first pass along a cut line comprising a curve. The beam waist traverses an edge of the chemically strengthened glass substrate, and a speed of the translated beam waist during the first pass is within the range of about 0.1 mm to about 5 mm per second. The beam waist may then be translated in a second pass along the cut line such that the beam waist traverses the edge of the chemically strengthened glass substrate and the speed of the translated beam waist during the second pass is within the range of about 0.1 mm to about 5 mm per second. A crack propagates from the edge of the chemically strengthened glass substrate along the cut line trailing the translated beam waist during the second pass.

BRIEF DESCRIPTION OF THE DRAWINGS

FIGS. 6A-6C schematically depict a beam waist of a pulsed laser beam being translated through a chemically strengthened glass substrate in a first pass along a cut line according to one or more embodiments;

FIGS. 7A-7C schematically depict a beam waist of a pulsed laser beam being translated through a chemically strengthened glass substrate in a second pass along a cut line according to one or more embodiments;

DETAILED DESCRIPTION OF THE PREFERRED EMBODIMENTS

Figure 1:
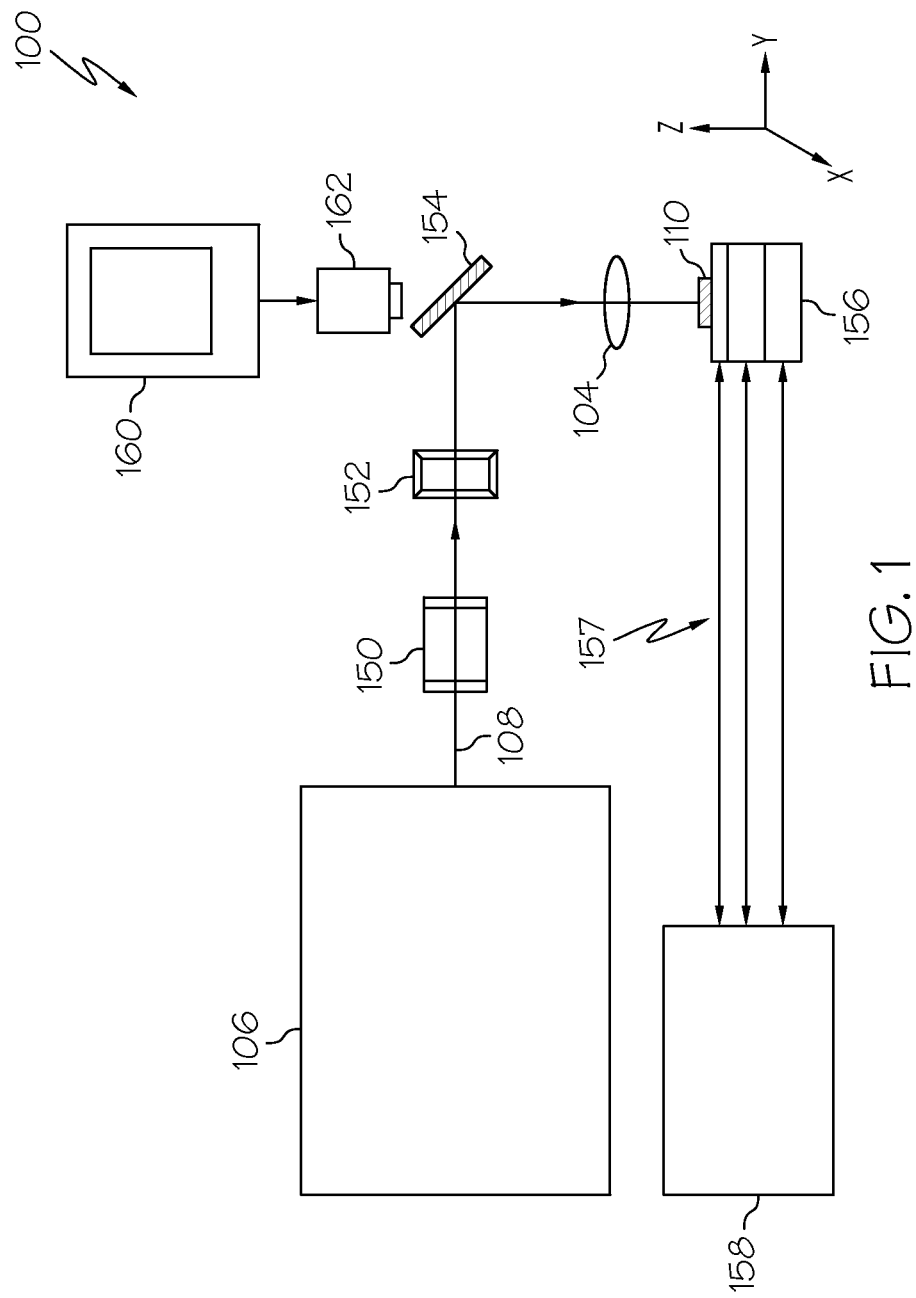
FIG. 1 schematically depicts an exemplary laser cutting system according to one or more embodiments.

Reference will now be made in detail to various embodiments for cutting chemically strengthened glass substrates, examples of which are illustrated in the accompanying drawings. Whenever possible, the same reference numerals will be used throughout the drawings to refer to the same or like parts.

As described herein, methods for cutting an article from a chemically strengthened glass substrate may generally comprise focusing a beam waist of a pulsed laser beam into an inner tensile region of the glass substrate. The glass substrate may be strengthen by an ion exchange process, for example, or any other process capable of creating surface compressive layers in the glass substrate. The beam waist may be translated along a cut line in a first pass, traverse an edge of the glass substrate during the first pass, and then be translated again along the cut line in a second pass such that the beam waist traverses the edge of the glass substrate. A crack propagates from the edge of the glass substrate ahead of the translated beam waist to separate the article from the glass substrate. In this manner, embodiments described herein are capable of completely separating an article having a straight, curved and/or arbitrary edge from a glass substrate that has undergone chemical strengthening in a clean and controlled fashion. Various embodiments of the methods for cutting articles will be described in more detail herein below.

Figure 2:
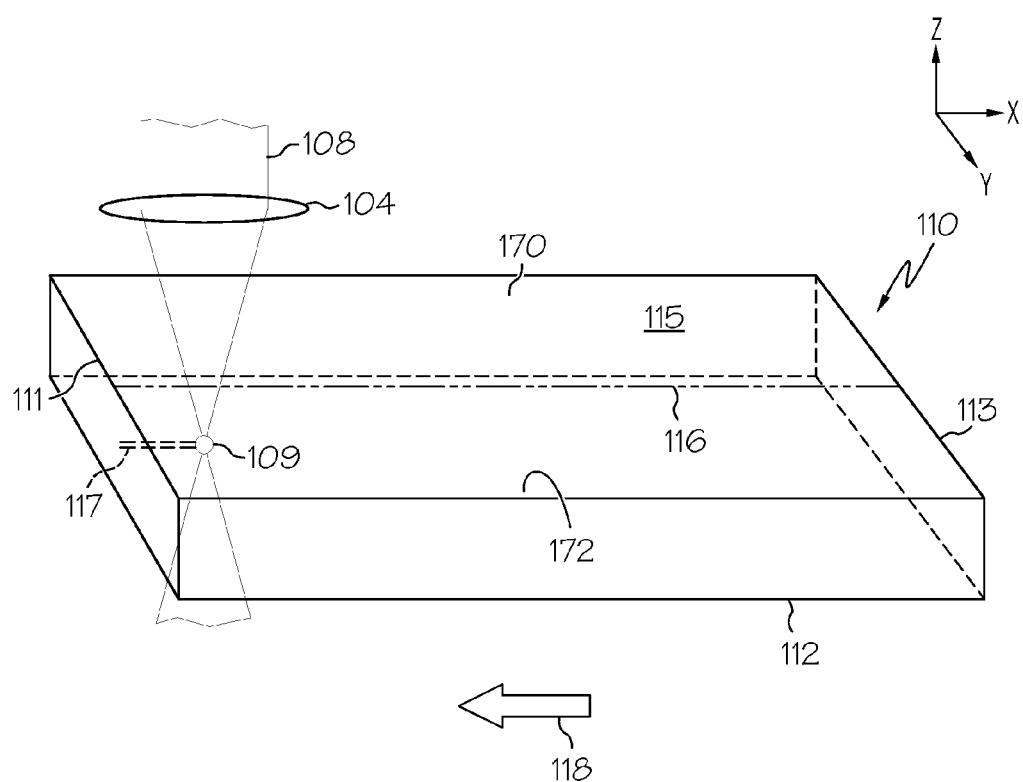
FIG. 2 schematically depicts a focused pulsed laser beam forming a defect line in an inner tensile region of a chemically strengthened glass substrate according to one or more embodiments.

Referring to FIGS. 1 and 2, an exemplary system for cutting an article (e.g., rectangular articles 170 and 172) from a chemically strengthened glass substrate 110 by focusing a pulsed laser beam 108 into the bulk of the glass substrate 110 is illustrated. The system 100 may generally comprise a laser source 106 operable to emit a pulsed laser beam 108 having a broad spectrum centered around wavelengths from UV to the near infrared spectrum, a mirror 154 and focusing lens 104 to direct and focus the pulsed laser beam 108 toward the glass substrate 110, and a 3-axis motion assembly 156 to translate the glass substrate 110 along the x, y, and z axes. The laser source 106 may be operable to produce an ultra-short pulsed laser beam 108. As an example and not a limitation, the laser source 106 may emit a pulsed laser beam having a full width, half maximum (FWHM) duration of about 50 fs at 1 kHz, a power of about 1 W, and a laser beam diameter of about 6 mm.

A lens and optical attenuator assembly 150 may be incorporated into the system 100 to receive the pulsed laser beam 108 and adjust a collimation and optical power of the beam. A beam shutter 152 may also be optionally utilized to block the pulsed laser beam 108 to prevent unnecessary exposure and laser damage to the glass substrate 110. After passing through the beam shutter 152, the pulsed laser beam 108 is directed toward the focusing lens 104. The focusing lens 104 may be configured to focus the pulsed laser beam 108 to a small beam waist or spot that is positioned below the surface of the glass substrate 110 (e.g., the beam waist 109 positioned below first surface 115 in FIG. 2). In one embodiment, the focusing lens 104 may be a large aperture (e.g., 0.26<NA<0.42) near infrared objective lens (e.g., 10×, 20×, or 50× depending on the parameters of the cutting process).

As illustrated in FIG. 1, the glass substrate 110 is supported by a 3-axis motion assembly 156 configured to translate the glass substrate 110 in the x, y and z axes. It will be understood that in other embodiments, the glass substrate 110 may remain static and the pulsed laser beam may translate. For example, the mirror 154 and focusing lens 104 may be configured to be translated with respect to the glass substrate 110 such that the pulsed laser beam 108 is translated along the x, y and z axes. The 3-axis motion assembly 156 may be controlled by a computer controller 158 via control signals 157 to move the glass substrate 110 in three dimensions.

The cutting of the glass substrate 110 may be monitored by a camera 162 coupled to a monitor 160. The camera 162 and monitor 160 may also be used to locate the object focus of the objective lens (i.e., the beam waist 109 of FIG. 2) at the surface of the glass substrate 110. The beam waist 109 may be positioned near an edge of the glass substrate (e.g., first edge 111 of FIG. 2). Once the relative position of the focus of the objective lens is found, the glass substrate 110 may be translated along the z axis to position the beam waist 109 into an inner tensile region of the glass substrate (see FIG. 2).

Referring now to FIG. 2, embodiments described herein may be utilized to cut an article (e.g., rectangular article 170 or 172) from a chemically strengthened glass substrate 110 having a first surface 115 (e.g., a top surface), a second surface 112 (e.g., a bottom surface), a first edge 111, and a second edge 113. Embodiments may be used to cut chemically strengthened glass substrates of varying thickness, such as a thickness within the range of about 0.50 mm to 2.00 mm, for example. The glass substrate 110 may be formed from various glass compositions including, without limitation, chemically strengthened borosilicate glasses or aluminosilicate glass. The methods described herein may be used to cut glass substrates having a relatively high thermal coefficient of expansion. Other glass substrate characteristics such as modulus of elasticity, thermal conductivity and thickness of the glass should also be considered. Generally, it becomes easier to propagate a crack using the methods described herein with a glass substrate having a high coefficient of expansion and a low modulus of elasticity.

Figure 4:
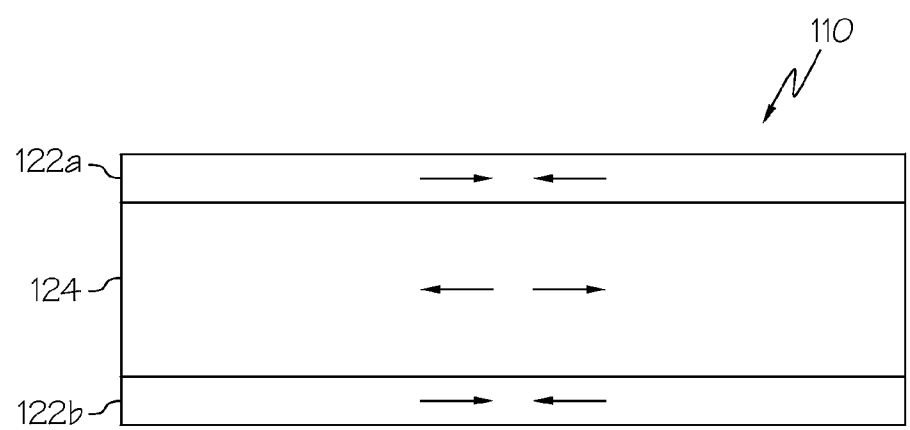
FIG. 4 schematically depicts compressive layers and an inner tensile region of a chemically strengthened glass substrate.
Figure 5:
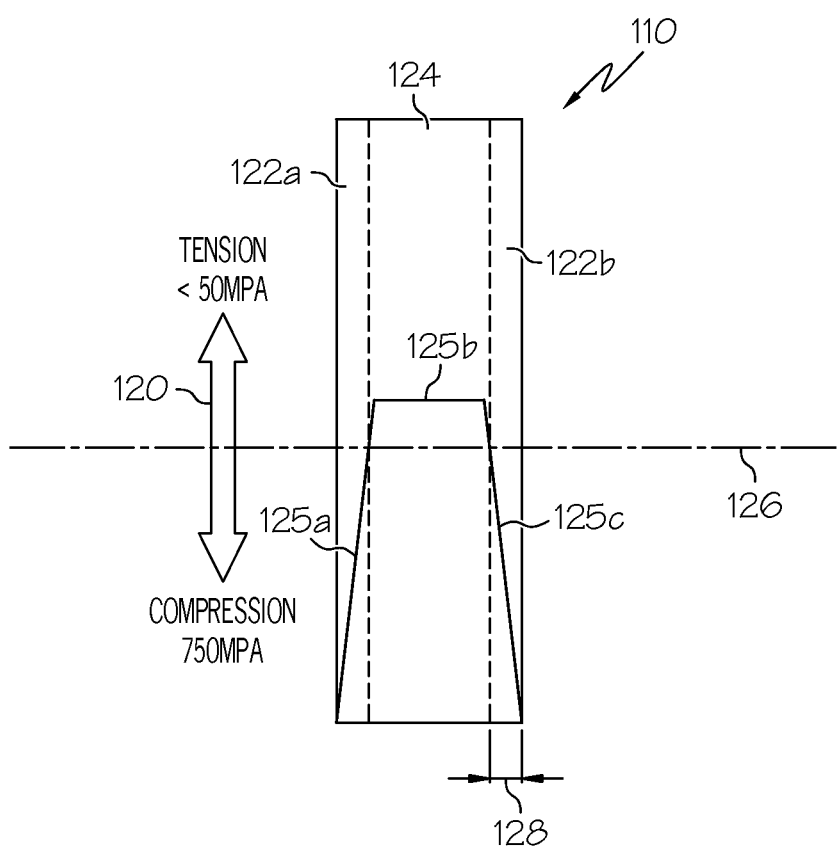
FIG. 5 graphically depicts compressive and tensile stresses within a chemically strengthened glass substrate.

FIG. 4 schematically illustrates a glass substrate 110 chemically strengthened by an ion exchange process. The glass substrate 110 comprises two surface compression layers 122a and 122b and an inner tensile region 124. The surface compression layers 122a and 122b are kept in a compressive stress state that provides the glass substrate 110 its strength. The inner tensile region 124 is under tensile stress to compensate for the compressive stresses in the surface compression layers 122a and 122b such that the forces balance each other and the glass substrate does not fracture. FIG. 5 graphically illustrates a stress profile of an exemplary glass substrate 110. As indicated above, the glass substrate 110 comprises two surface compression layers 122a and 122b having an ion exchange depth of layer (DOL) as indicated by depth 128. Graph lines 125a, 125b, and 125c illustrate the stress profile in different regions of the glass substrate. Line 126 represents zero stress forces. As illustrated in FIG. 5, the stress profile in the surface compression layers 122a and 122b of the exemplary glass substrate 110 are under significant compressive stress (e.g., about 750 MPa near the surface of the glass substrate 110). The center tension of the inner tensile region increases as a reaction to the increase of compressive surface stress (e.g., about 50 MPa). In general, the magnitude of central tension stress impacts the glass fragmentation and the magnitude of surface compressive stress and DOL determine the strength of the glass.

As described in more detail below, embodiments described herein may cut an article from a chemically strengthened glass substrate 110 by first forming a defect line (e.g., the start of defect line 117) within the bulk of the glass substrate 110. Referring again to FIG. 2, the defect line 117 may be formed by irradiating the glass substrate 110 with a pulsed laser beam 108 that is focused to a point or beam waist 109 that lies within the glass substrate 110 between a first and second surface 115, 112. Because the glass substrate 110 is transparent at the wavelength of the pulsed laser beam 108, it is possible to position the laser focus below the surface of the glass substrate 110 without damaging it.

Where material is transparent to the laser beam wavelength, little or no change to the material may be expected, but if the laser intensity is high enough, it may induce absorptive nonlinear optical effects. When the laser intensity is above a threshold, the material of the glass substrate may be modified via a nonlinear effect known as multi-photon ionization at the beam waist. Multi-photon ionization relies on the response of the glass material to a high intensity electromagnetic field generated by the pulsed laser beam that ionizes electrons and leads to optical breakdown and plasma formation. By translating or scanning the beam waist over a cut line, a narrow defect line resulting from the optical breakdown and plasma formation may be formed and define the perimeter or shape of the article that is to be cut from the glass substrate.

Because multi-photon absorption is a nonlinear process, the magnitude of its effect varies quickly with the applied optical intensity of the laser pulse. The intensity provides the instantaneous energy flux delivered by the optical pulse through the beam waist provided by the focusing lens. The shorter the pulse width and smaller the area of the focused laser beam the higher the intensity.

Figure 3:
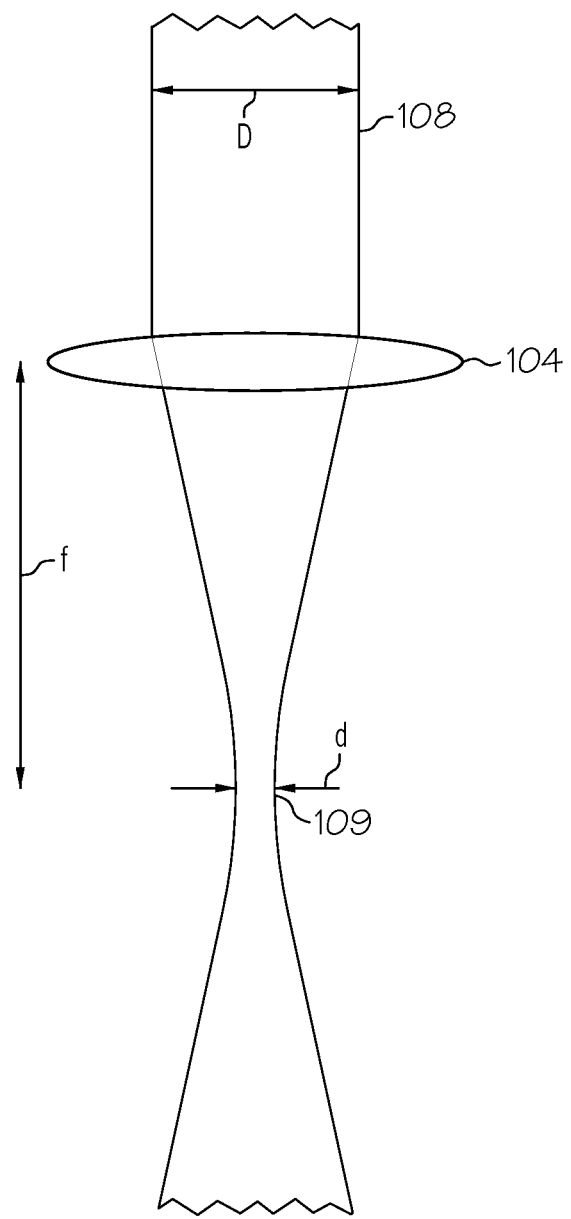
FIG. 3 schematically depicts a pulsed laser beam focused by a focusing lens according to one or more embodiments.

Referring to FIGS. 1-3, the laser source 106, focusing lens 104 and glass substrate 110 parameters should be matched to confine the defect line 117 to as small of an area as possible. The higher the energy density within the glass substrate 110, the higher the intensity of the electromagnetic field generated by the pulsed laser beam 108. The energy density may be controlled by the focusing lens 104. For example, a tight focus that provides a small beam waist 109 may yield a high energy density and therefore a high intensity. The laser pulse intensity $I_{pulse}$ may be expressed by:

$$I_{pulse} = \frac{P_{avg} \cdot T}{t_{pulse} \cdot \text{Area}} = \frac{P_{avg} \cdot T}{t_{pulse} \cdot \pi r^2}, \quad \text{Eq. (1)}$$

where $P_{avg}$ is the laser average power, T is the period between laser pulses, $t_{pulse}$ is the FWHM pulse duration and Area is the area measured at the beam waist 109 of the focused laser beam (FIG. 3). The radius r may be expressed as:

$$r \approx 1.27 \times \frac{\lambda \cdot f}{2 \cdot D}, \quad \text{Eq. (2)}$$

where $\lambda$ is the wavelength, f is the focal length, and D is the native diameter of the pulsed laser beam 109.

The laser source 106 and focusing lens 104 may be matched to achieve an ideal intensity for the cutting operation. If the laser intensity is not enough to create the nonlinear effect (e.g., a low energy density resulting from too large of a beam waist), no defect line may be created. Conversely, if the laser intensity is too high, damage to the glass substrate may occur. For example, a long depth of focus and high energy density may cause damage at the surface of the glass substrate despite the beam waist being positioned within the bulk of the glass substrate.

Embodiments described herein provide the high intensity fields required to initiate multi-photon absorption within the glass substrate to successfully cut chemically strengthened glass substrates with a laser source operable to produce an ultra-short pulsed laser beam. Due to the mechanical properties of chemically strengthened glass substrates, high power continuous wave lasers (e.g., 10 W and greater) or lasers operating at longer pulse widths such as pulse widths in the picosecond to microsecond range may create heat affected zones (due to either material absorption in linear regime or to induced nonlinear optical effects) that induce micro-cracks within the glass that may, because of the compressive and tensile stresses within the chemically strengthened glass substrate, shatter the glass into smaller pieces. Heat affected zones are defined as regions within the bulk of the substrate that are modified or impacted due to heat generation caused by the interaction between the material and laser radiation.

As an example and not a limitation, a laser source may be operated to produce a pulsed laser beam having a 50 fs pulse width and an output power of 0.7 W. A 50× objective lens may be used to create an irradiated area of $2.64 \times 10^{14}$ cm$^2$. A laser source operating under these parameters may produce a calculated intensity of approximately $5.3 \times 10^{17}$ W/cm$^2$. As an example, the intensity per pulse at the intrinsic breakdown of fused silica is approximately $1.67 \times 10^{13}$ W/cm$^2$. The laser source operated under the parameters above is therefore capable of applying an intensity to induce the nonlinear optical effect and create a defect line. Similarly, a laser source operated at 0.85 W and the same remaining parameters as the example above may generate an intensity of approximately $6.43 \times 10^{17}$ W/cm$^2$. Further, intensity levels of greater than $2.12 \times 10^{17}$ W/cm$^2$ may be achieved using the power levels and pulse width above in conjunction with 10×, 20× and 50× objective lenses.

Increasing the pulse width of the pulsed laser beam decreases the level of intensity provided to the glass substrate. For example, a 50 picosecond laser operated at 0.7 W with a 50× objective lens may produce an intensity of only $5.30 \times 10^{12}$ W/cm$^2$, which may not be enough to induce the nonlinear optical effect in chemically strengthened glass. To produce a defect line that enables full separation of glass substrates with a laser source operated at pulse widths in the picosecond range or greater, much smaller beam waist or spot sizes (i.e., higher magnification objectives) and higher powers may be necessary.

Overheating of the heat affected zones within chemically strengthened glass substrates may cause the glass to shatter or produce a crack that deviates from a desired cut line. Similar to continuous wave lasers that are highly absorbed by the material of the glass substrate, lasers emitting a pulsed laser beam that is longer than the time the material takes to release the absorbed energy from the laser (from tens of ps to microseconds) may create heat affected zones within the glass substrate. The presence of heat affected zones can also be induced by delivery of high repetition pulses (even for pulses as short as 50 fs) because of a cumulative effect of the pulses.

Embodiments of the present disclosure prevent or minimize the formation of heat affected zones as well as the cracking of the surface compression layers (and damage to the glass substrate) by utilizing a pulsed laser beam having an ultra-short pulse duration that is less than about 1000 fs. Because of this ultra-short pulse duration, the operational power of the laser source may be relatively low. For example, separation of an article from the glass substrate may be obtained with a femtosecond laser operating at less than one watt.

The ultra-short pulses interact with the material without micro-cracking and fragmentation because the pulses of laser radiation provided by embodiments described herein occur in a very short time scale, and the material's transparency to the laser radiation minimizes the induced thermal effects. The ultra-short pulse duration controls the application of laser radiation by delivering energy to the glass substrate quickly such that heat does not propagate within the glass substrate to generate micro-cracks that may lead to shattering of the glass substrate. To prevent or minimize heat affected zones, the pulses of laser radiation may be applied at a frequency such that the region of the glass substrate being heated has time to relax after receiving the pulse of laser radiation. For example, a femto second laser operating at about 50 fs and about 1 kHz provides for a low duty cycle in which the heat affected zones may relax prior receiving an additional pulse of laser radiation.

The laser source may be any ultra-short pulse laser capable of providing pulses of UV, visible, infrared or near infrared laser radiation within the femtosecond range that are capable of triggering the nonlinear multi-photon effect. Exemplary laser sources may include, but are not limited to, Ti:Sapphire, fiber, and Nd:YVO$_4$ lasers. The output wavelength of the laser beam emitted by the laser source may be of a wavelength such that the glass substrate has negligible optical absorption to the laser radiation, such as wavelengths in the 400 nm to 1500 nm range, for example.

Methods of cutting an article from a chemically strengthened glass substrate using pulsed laser beams described above will now be described in detail. To cut the glass substrate 110 along the cut line 116 (see FIG. 2), the beam waist 109 is translated through the inner tensile region of the glass substrate in a first pass along the cut line 116 as illustrated in FIGS. 6A-6C. The beam waist 109 is then translated through the glass substrate in a second pass along the cut line 116 as illustrated in FIGS. 7A-7C. Referring to FIG. 6A, a pulsed laser beam 108 having a pulse duration between about 30 fs and 1000 fs may be focused by a focusing lens 104 to form a beam waist 109. As described above, a 3-axis motion assembly 156 (FIG. 1) may be used to position the beam waist 109 in the same horizontal plane as the inner tensile region (i.e., center region) of the glass substrate 110. By aligning the beam waist 109 with the center of the glass substrate 110, the laser intensity will be enough to trigger the multi-photon effect and induce damage to the inner tensile region of the glass substrate 110.

In the illustrated embodiment, the glass substrate 110 is translated in a direction as indicated by arrow 118. In other embodiments, the pulsed laser beam 108 may be translated rather than the glass substrate 110 (e.g., by translating the mirror 154 and/or focusing lens 104 illustrated in FIG. 1). Because of the high stresses within the chemically strengthened glass substrate 110, as well as the high thermal coefficient of expansion, the translation speed of the glass substrate 110 may be as high as 60 mm/s or higher. Slower translation speeds may also be utilized.

The beam waist 109 passes into the inner tensile region of the glass substrate 110 as the glass substrate 110 is translated. Referring to FIG. 6B with general reference to FIGS. 1 and 2, the glass substrate 110 is irradiated by the beam waist 109 of the pulsed laser beam 108 between the first and second surfaces 115 and 112. By translating the glass substrate 110 with the 3-axis motion assembly 156, a narrow defect line 117 may be created along the cut line 116. The computer controller 158 may be programmed to control the 3-axis motion assembly 156 to translate the glass substrate 110 in accordance with the cut line 116. The glass substrate 110 may continue to be translated until the beam waist 109 exits the second edge 113 of the glass substrate as illustrated in FIG. 6C. A defect line 117 that follows the cut line 116 is now present within the inner tensile region of the glass substrate 110. During the first pass, both surfaces 115 and 112 remain intact and substantially no modification is present within the glass substrate 110 other than the defect line 117 created at the center.

Referring now to FIGS. 7A-7C, the glass substrate may be translated in an opposite direction as indicated by arrow 118 after the creation of the defect line 117 such that the beam waist 109 retraces the same path as during the first pass illustrated in FIGS. 6A-6C (i.e., travels along the cut line 116 and defect line 117). The pulsed laser beam 108 may operate at the same parameters (e.g., pulse duration, power, frequency, etc.) during the second pass as during the first pass. As illustrated in FIG. 7A, the beam waist 109 traverses the second edge 113 of the glass substrate 110. FIGS. 7B and 7C illustrate a crack 119 that propagates ahead of the beam waist as the glass substrate 110 is translated. To initiate crack propagation along the defect line 117/cut line 116, the beam waist 109 should cross an edge of the glass substrate 110 at least once during both the first and second passes. If the beam waist is translated but it does not cross an edge, a defect line may be created in the interior of the glass substrate but no cracking may occur and the glass substrate may not split.

As stated above, the size of the defect line 117 should be made as small as possible to prevent uncontrollable crack propagation and shattering of the glass substrate. A defect line having a position and a size such that it extends into a compression layer may cause a crack to deviate from the cut line uncontrollably. Conversely, a relatively small defect line 117 that does not extend into a compressive layer (e.g., compression layer 122a or 122b) but instead is contained within the inner tensile region 124 guides a crack 119 that follows the cut line in a controlled manner (see FIG. 8C). As detailed above, the size of the defect line may be determined by the laser intensity and the objective magnification used to focus the pulsed laser beam into the inner tensile region of the glass substrate. The thickness of the glass substrate may dictate how large of a defect line may be used to separate the glass substrate. For example, a 0.95 mm thick glass substrate may shatter or crack during the first or second pass when a 10× or 20× objective lens is used but effectively separate the glass substrate when a 50× objective lens is used. A 10× or 20× objective lens (as well as a different laser intensity) may be used to effectively separate a thicker glass substrate, however.

Because the first and second compression layers are under compressive stress and the inner tensile region is under tensile stress, the crack 119 propagates ahead of the beam waist 109 along the defect line 117 at a terminal velocity as determined by the resistance of the strengthened glass substrate 110 along the defect line 117. As shown in FIG. 7C, the crack 119 may fully propagate and split the glass substrate 110 before the beam waist 109 crosses the first edge 111 without requiring a further breaking step. The weakened defect line 117 created during the first pass serves as a guiding line for the propagation of the crack 119. Because the defect line 117 is created within the glass substrate 110, the presence of debris during the cutting step of the second pass is substantially minimized. The defect line 117 may be a molten region, thereby preventing the creation of debris when the article is separated from the glass substrate 110. The small defect line 117 provided by the small beam waist 109 restricts the area of damage such that the strength of the cut edge of the article is preserved. Glass substrates cut by the methods described herein have processed edge strengths that may be greater than or equal to than conventionally scored/broken, edged and chamfered parts, with and without additional steps of lap, polish and mechanical finishing.

Figure 8C:
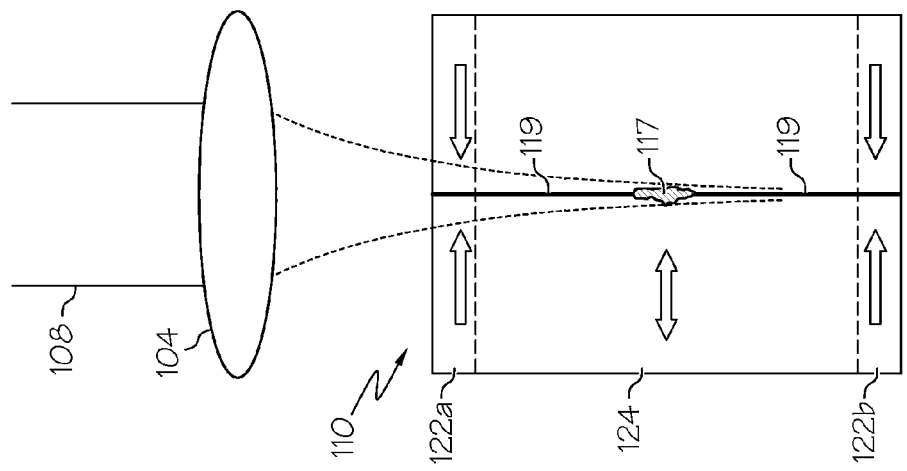
FIGS. 8A-8C schematically depict a lateral view of a glass substrate during and after first and second passes of a laser beam according to one or more embodiments.
Figure 8B:
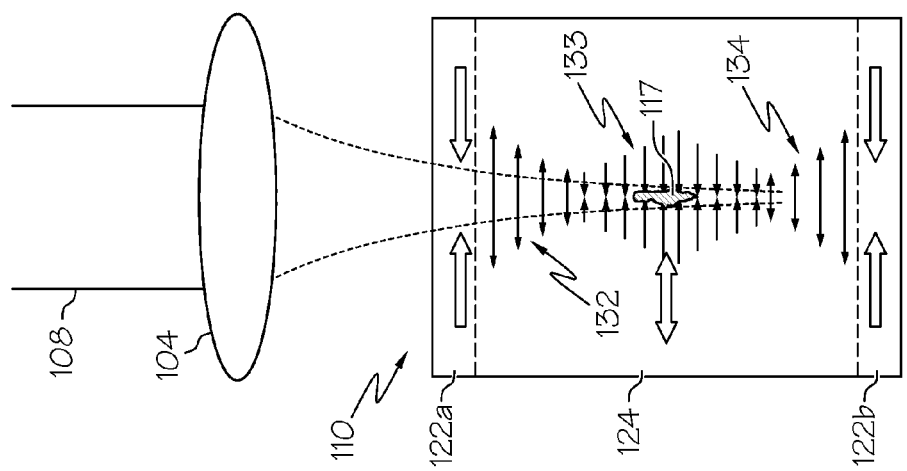
Figure 8A:
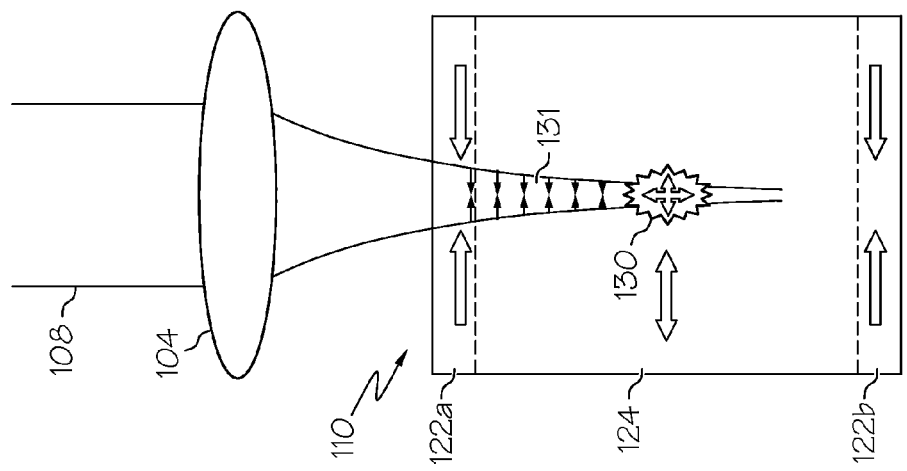

Referring now to FIGS. 8A-8C, the crack propagation may be associated with the combination of the glass substrate stress history and the pulsed laser beam thermal stress as well as the pressure exerted on the defect line by the generated plasma of the multi-photon absorption effect. The stress history is defined by the ion exchange process that results in the surface layers being under compression and the center of the glass substrate being under tension. At room temperature, the compressive stresses and tensile stresses balance one another. However, when the pulsed laser beam is focused at the center of the glass thickness within the inner tensile region, a plasma ball 130 may be formed around the position of the beam waist, which increases the local temperature and pressure, as illustrated in FIG. 8A. This creates an internal compressive region 133 (FIG. 8B) within the inner tensile region 124 of the glass substrate as well as temporary compressive forces 131 during the laser pulse. After the first pass, the layers above and below this internal compression region 133 react by creating tensile stress in the form of first and second internal tension layers 132 and 134, as depicted in FIG. 8B. During the first pass, the local plasma temperature of the beam waist is high enough to melt the glass and create a void, but the tensile and compressive forces may be balanced such that a crack is not formed. However, during the second pass, that balance is broken by the applied heat of the pulsed laser beam as the beam waist crosses the edge of the glass substrate and follows the defect line. The energy stored in the compressive stress layer is released once the balance of forces is broken, translating into crack propagation at an increased speed. The crack may propagate quickly at essentially terminal velocity (e.g., faster than 60 mm/s) ahead of the beam waist. FIG. 8C illustrates a lateral view of a glass substrate 110 after the second pass in which a crack 119 has propagated along the defect line 117.

As an example and not a limitation, a 0.95 mm thick sheet of a fusion drawn alkali aluminosilicate glass (Corning Code 2317) having a thermal coefficient of expansion of about $90 \times 10^{-7}/°$ C. was chemically strengthened by an ion exchange process comprising immersing the glass sheet in molten salt baths of $KNO_3$ at 410° C. for about seven hours. The ion exchange process resulted in a chemically strengthened glass sheet having a DOL of about 51 µm, center tension of about 46 MPa in the inner tensile region and compressive stress forces of about 769 MPa in the surface compression layers. To cut an article from the glass sheet, an amplified Ti:Sapphire laser source with a spectrum centered around 800 nm was operated to emit a pulsed laser beam having a duration of 50 fs at 1 kHz and a power of approximately 850 mW. The pulsed laser beam had a 6 mm diameter that was focused to a beam waist by a 50× objective focusing lens. To cut along straight cut lines, the glass was translated at a speed of approximately 60 mm/s during both the first and second passes. During the second pass, a crack propagated at a speed greater than the glass translation speed and ahead of the beam waist. The methods described herein were used to cut the glass sheet into pieces that were as large as 109×54 $mm^2$ and into pieces as small as 5×5 $mm^2$.

Figure 9:
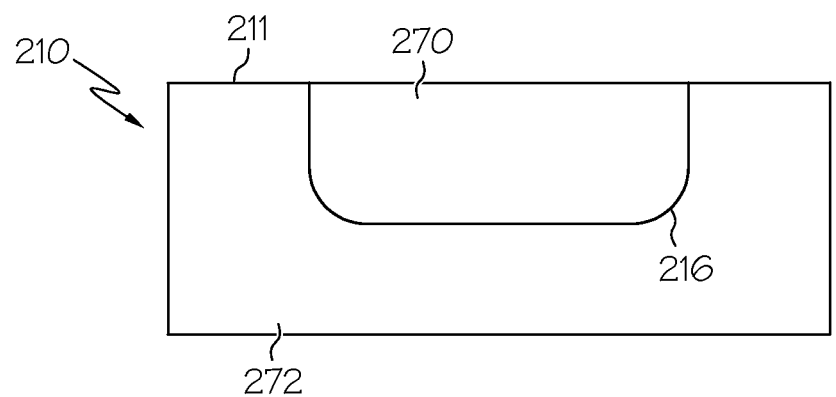
FIG. 9 schematically depicts a chemically strengthened glass substrate having a curved cut line according to one or more embodiments.

Referring now to FIG. 9, embodiments disclosed herein may also be utilized to cut along a curved cut line 216 to separate an article having a curved edge from a chemically strengthened glass substrate 210. The curved cut line 216 may begin and terminate at a single edge 211 as illustrated in FIG. 9. Further, cut lines comprising many curves may be cut by the embodiments described herein to form an article having a complex arbitrary shape. Crack propagation may follow a defect line formed over a curved cut line having a corner with a radius as small as 7 mm without crack deviation. Cutting along curved cut lines may require a slower translation speed than when cutting straight lines. For example, to cut a 10 mm corner, the speed of the translated beam waist (by translating the laser source or the glass substrate) may be within the range of 0.1 mm per second to 5 mm per second such that the crack propagation trails rather than leads the beam waist.

Figure 10:
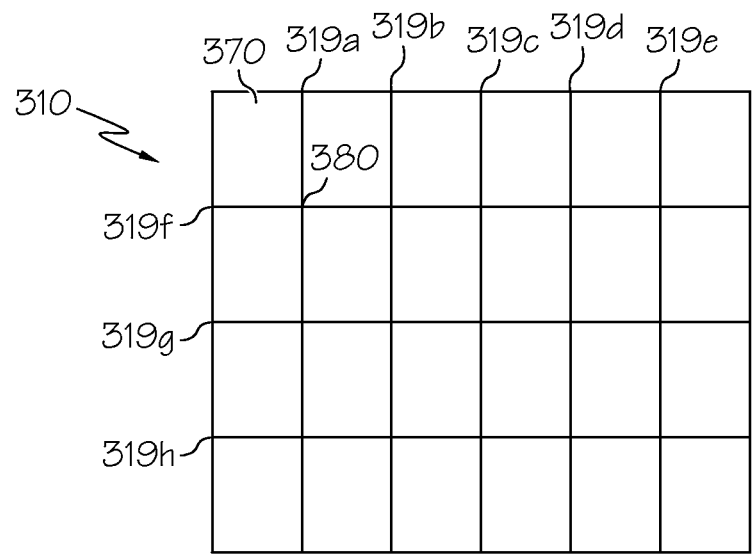
FIG. 10 schematically depicts a diced chemically strengthened glass substrate according to one or more embodiments.

Embodiments described herein may also be utilized to dice a chemically strengthened glass substrate into a plurality of smaller pieces. Referring to FIG. 10, a glass substrate 310 has been diced into several smaller articles (e.g., article 370) by vertical cracks 319a-319e and horizontal cracks 319f-319h. During the dicing application, the crack propagates along the cut line even at intersections of orthogonal paths (e.g., intersection 380). The dicing application may be desirable in high volume manufacturing applications in which large quantities of articles may be produced quickly and efficiently. Because of the fast crack propagation and the ability to dice a chemically strengthened glass substrate, embodiments described herein offer an attractive solution for mass production of chemically strengthened glass parts. Further, thin film processing of multiple displays, such as touch panels, may be performed on a single glass substrate rather than by a piece-by-piece process.

Systems and methods described herein may be used to cut articles from chemically strengthened glass substrates having increased compressive and tensile forces therein, such as chemically strengthened aluminosilicate glasses. The ultra-short pulse duration of the systems and methods described herein allows for irradiated regions within the glass substrate to relax prior to receiving additional pulses of laser radiation, thereby preventing the chemically strengthened glass substrate from shattering during the cutting process. Embodiments also enable process streamlining by allowing articles to be cut to size from a glass substrate that has already been chemically strengthened. Additionally, articles may be cut to final sizes and shapes directly rather than by multiple cutting steps and processes.

Processed edges produced by systems and methods described herein retain superior edge strength and, because of the very small defect line created by the focused pulsed laser beam, retain a clean surface quality. Almost no debris is created during the cutting of the second pass. Cut lines comprising curves and arbitrary shapes may be cut along the defect line without crack deviation, and glass substrates may be diced into multiple smaller pieces to increase the efficiency of producing large quantities of chemically strengthened glass parts.

For the purposes of describing and defining the embodiments herein, it is noted that the terms "approximately," "about" and "substantially" are utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

It is noted that recitations herein of a component of the present invention being "configured" or "operable" in a particular way, "configured" or "operable" to embody a particular property, or function in a particular manner, are structural recitations as opposed to recitations of intended use. More specifically, the references herein to the manner in which a component is "configured" or "operable" denotes an existing physical condition of the component and, as such, is to be taken as a definite recitation of the structural characteristics of the component.

It is noted that one or more of the following claims utilize the term "wherein" as a transitional phrase. For the purposes of defining the embodiments described herein, it is noted that this term is introduced in the claims as an open-ended transitional phrase that is used to introduce a recitation of a series of characteristics of the structure and should be interpreted in like manner as the more commonly used open-ended preamble term "comprising."

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of cutting an article from a chemically strengthened glass substrate comprising:
   generating a pulsed laser beam from a laser source, the pulsed laser beam having a pulse duration less than about 1000 fs and an output wavelength such that the chemically strengthened glass substrate is substantially transparent to the pulsed laser beam;
   focusing the pulsed laser beam to form a beam waist;
   positioning the beam waist of the pulsed laser beam such that the beam waist is located in the same horizontal plane as an inner tensile region of the chemically strengthened glass substrate;
   translating the beam waist in a first pass along a cut line, thereby forming a molten defect line within the inner tensile region of the chemically strengthened glass substrate, wherein the beam waist traverses an edge of the chemically strengthened glass substrate; and
   translating the beam waist in a second pass along the cut line that retraces the first pass, wherein the beam waist traverses the edge of the chemically strengthened glass substrate and travels along at least a portion of the molten defect line formed by the first pass such that a crack propagates from the edge of the chemically strengthened glass substrate along the cut line ahead of the translated beam waist during the second pass.

2. The method of claim 1 wherein
   a size of the molten defect line is such that the crack controllably propagates along the defect line during the second pass.

3. The method of claim 1 wherein the pulse duration is about 50 fs.

4. The method of claim 3 wherein a duty cycle of the pulsed laser beam is about 1 kH and a power of the pulsed laser beam is about 850 mW.

5. The method of claim 1 wherein translating the beam waist in the first and second passes comprises translating the chemically strengthened glass substrate.

6. The method of claim 1 wherein the cut line comprises a curve.

7. The method of claim 1 wherein the cut line begins and terminates along a single edge of the chemically strengthened glass substrate.

8. A method of separating an article from a substrate having an inner tensile region positioned between a first and second surface compression layer, the method comprising:
   forming an internal compression region within the inner tensile region of the substrate along a cut line, wherein the cut line begins at an edge of the substrate and the formation of the internal compression region generates a first and a second internal tension layer positioned above and below the internal compression region, respectively; and
   heating the generated internal compression region such that a tensile stress of the first and second internal tension layers is increased and a crack initiates from the edge of the substrate and propagates along the inner tensile region.

9. The method of claim 8 wherein forming the internal compression region within the inner tensile region of the substrate further comprises:
   generating a pulsed laser beam from a laser source;
   focusing the pulsed laser beam to form a beam waist;
   positioning the beam waist of the pulsed laser beam such that the beam waist is located in the same horizontal plane as the inner tensile region of the substrate; and
   translating the beam waist in a first pass along the cut line, thereby forming a molten defect line within the inner tensile region of the substrate, wherein the beam waist traverses the edge of the substrate.

10. The method of claim 9 wherein heating the generated internal compression region further comprises translating the beam waist in a second pass along the cut line that retraces the first pass, wherein the beam waist traverses the edge of the substrate and travels along at least a portion of the molten defect line formed by the first pass such that the crack propagates from the edge of the substrate along the cut line ahead of the translated beam waist during the second pass.

11. The method of claim 10 wherein translating the beam waist in the first and second passes comprises translating the laser source.

12. The method of claim 10 wherein translating the beam waist in the first and second passes comprises translating the substrate.

13. The method of claim 10 wherein:
   the cut line comprises a curve; and
   a speed of the translated beam waist in the first and second passes is within the range of about 0.1 mm to about 5 mm per second.

14. The method of claim 10 wherein the pulsed laser beam has a pulse duration less than about 1000 fs and an output wavelength such that the substrate is substantially transparent to the pulsed laser beam.

15. The method of claim 14 wherein the pulse duration is about 50 fs.

16. The method of claim 15 wherein a duty cycle of the pulsed laser beam is about 1 kH and a power of the pulsed laser beam is about 850 mW.

17. The method of claim 8 wherein the cut line begins and terminates along a single edge of the substrate.

18. A method of cutting an article from a chemically strengthened glass substrate comprising:
   generating a pulsed laser beam from a laser source, the pulsed laser beam having an output wavelength such that the chemically strengthened glass substrate is substantially transparent to the pulsed laser beam;
   focusing the pulsed laser beam to form a beam waist;
   positioning the beam waist of the pulsed laser beam such that the beam waist is located in the same horizontal plane as an inner tensile region of the chemically strengthened glass substrate;

translating the beam waist in a first pass along a cut line comprising a curve, thereby forming a molten defect line within the inner tensile region of the substrate, wherein the beam waist traverses an edge of the chemically strengthened glass substrate and a speed of the translated beam waist during the first pass is within the range of about 0.1 mm to about 5 mm per second; and translating the beam waist in a second pass along the cut line that retraces the first pass, wherein the beam waist traverses the edge of the chemically strengthened glass substrate, the beam waist travels along at least a portion of the molten defect line formed by the first pass, and the speed of the translated beam waist during the second pass is within the range of about 0.1 mm to about 5 mm per second such that a crack propagates from the edge of the chemically strengthened glass substrate along the cut line trailing the translated beam waist during the second pass.

19. The method of claim 18 wherein the pulsed laser beam has a pulse duration less than about 1000 fs.

20. The method of claim 19 wherein the pulse duration is about 50 fs and the pulsed laser beam operates at a frequency of about 1 kHz.

\* \* \* \* \*